United States Patent [19]
O'Grady et al.

[11] Patent Number: 5,634,432
[45] Date of Patent: Jun. 3, 1997

[54] APPARATUS FOR PRODUCING ELECTRICAL ENERGY WITHIN THE BODY OF A RUMINANT

[76] Inventors: Gerald E. O'Grady, 4031 Rundlehorn Drive N.E., Calgary, Alberta T1Y 2K2; Andris A. Kveps, 6107 Thornaby Way N.W., Calgary, Alberta T2K 5K7; Geoffrey A. DeBoer, Box 189, Barons, Alberta T0L 0G0; Norman J. Ward, Box 118, Granum, Alberta T0L 1A0, all of Canada

[21] Appl. No.: 471,321

[22] Filed: Jun. 5, 1995

[51] Int. Cl.$^6$ .......................... A01K 29/00; A01K 11/00
[52] U.S. Cl. .................. 119/174; 119/51.02; 128/899; 128/903
[58] Field of Search ................... 119/51.02, 174; 128/899, 631, 903

[56] References Cited

U.S. PATENT DOCUMENTS 5,322,034  6/1994  Willham et al. .................. 119/174

FOREIGN PATENT DOCUMENTS

| 50687/93 | 12/1994 | Australia | 119/174 |
|---|---|---|---|
| WO093005648 | 4/1993 | Ireland | 119/174 |
| 000481566 | 4/1992 | Netherlands | 119/174 |
| WO87/04900 | 8/1987 | WIPO | 119/174 |

*Primary Examiner*—Robert P. Swiatek
*Assistant Examiner*—Yvonne R. Abbott

[57] ABSTRACT

The need to positively identify ownership of cattle is well recognized and understood and has given rise to the practice of hot iron branding. This method, however, has proven less than satisfactory and a variety of alternate methods have been explored with varying degrees of success. One such method utilizes a transponder encased in a pellet and deposited in the cow's reticulum where it remains until slaughter. This method, lacking an active source of electrical energy, is severely limited in its range of data transmission and in addition is unable to power other sensors for monitoring various bodily functions such as temperature. The present invention discloses a method and apparatus which overcomes these shortcomings by providing an active source of electrical power within the reticulum of the animal and which comprises an elongate, cylindrical zinc tube closed at one end and having an integral dividing wall with an elongate solid carbon rod extending coaxially therethrough. A first chamber in the zinc tube is coated with an insulating material such as plastic, which insulating material seals the carbon rod's passage through the dividing wall. The zinc tube first chamber is filled with a compaction of Manganese Dioxide which completely encases the carbon rod. A membrane, porous to the animal's digestive fluids covers the opening in the zinc tube and admits digestive fluids into the first chamber. The structure thus formed is essentially a single electrochemical cell capable of generating electrical energy. A second chamber in the zinc tube houses electronic circuitry which boosts the electrical power output of the cell to levels usable by a variety of additional electronics capable of monitoring bodily functions and transmitting this information along with animal identification information to a base station within a range of between 20 and 30 feet.

4 Claims, 3 Drawing Sheets

APPARATUS FOR PRODUCING ELECTRICAL ENERGY WITHIN THE BODY OF A RUMINANT

FIELD OF THE INVENTION

This invention relates to the field of cattle identification and monitoring, more particularly to a method and apparatus for generating and supplying electrical energy to electronic devices specifically designed to accomplish such identification and monitoring.

BACKGROUND—KNOWN ART

The need to uniquely identify one's cattle from those of another, both to positively establish ownership and curb theft, is, of course, well recognized and well understood and the traditional means employed to accomplish this identification, i.e., hot iron branding has been the method of choice for many years.

Apart from the simple fact that hot iron branding costs the cattle industry millions of dollars annually in damaged hides, it is a method which has suffered a considerable "fall from grace" in recent years—particularly with respect to animal rights activists—open as it is to considerable abuse.

It is not surprising then that, in relatively recent times, considerable inventive ingenuity has been applied to the problem of uniquely identifying cattle wherein the animal is subjected to no physical trauma and suffers no lasting and/or destructive effects as a result of the process.

One such developed identification system entailed the placement of a small transponder beneath the animal's hide. The small size of the transponder, however, resulted in a usable range of only several inches and quickly proved unsatisfactory. Increasing the size of the transponder appeared a workable solution to the limited range problem until it was discovered that transponders used in this way exhibited an unsettling tendency to migrate into the meat of the animal; the use of transponders in this fashion was thereafter quickly discontinued.

A more recent innovation is comprised of a transponder encased in a pellet which is, in turn, deposited into the animal's reticulum where it (the pellet) resides—with no apparent ill effects—until slaughter.

While undoubtedly superior to prior identification systems, this latter system nevertheless suffers from several significant shortcomings, not the least of which is that the nature of the transponder, lacking an associated active power source, has the continuing problem of a very limited data transmission range of approximately one meter under optimum condition. Needless to say, however, that in a practical environment, conditions are seldom optimum thus the limited range problem is indeed a very real problem which imposes restrictions on the commercial efficacy of this system.

In addition, the above system, lacking an active power source, is restricted to the provision of identification information only whereas it is also desirable to monitor a variety of the animal's bodily functions, particularly in a feed lot situation where the animals are typically subjected to crowding, rich diet and high stress. For example since high grain rations can lead to acidosis and liver damage there is an obvious economic imperative to monitoring stomach acid levels. Likewise the ability to monitor rumen ammonia levels provides an indication of the efficiency of food conversion and ultimately less food wastage.

It is desirable, therefore, to provide an active source of electrical power within the rumen of the animal in order to permit a dramatic increase in the range of data transmission—up to 30 feet—and to power a variety of sensors for monitoring various bodily functions.

OBJECTS AND ADVANTAGES

According to one aspect then, the present invention is an apparatus for producing electrical energy within the body of a ruminant comprising:

elongate tubular casing means having a first internal chamber means and a second internal chamber means, the casing means forming a first electrical cell electrode;

a second electrical cell electrode contained within the casing means first internal chamber and electrically insulated from the first electrical cell electrode;

electron collection means co-axial with the casing means, the collection means extending through the first internal chamber means and into the second internal chamber means;

means for introducing digestive fluids to the first chamber means;

electrical circuit means for converting the electrical energy produced by the combination of the first electrical cell electrode, the second electrical cell electrode and the digestive fluids to a magnitude sufficient to power additional circuitry contained within the second internal chamber means; and means for charging the electrical circuit means prior to normal operation of the electrical circuit means.

DRAWING FIGURES

A detailed description of the invention as exemplified by a preferred embodiment is contained herein having reference to the accompanying drawings wherein.

DESCRIPTION OF A PREFERRED EMBODIMENT

Figure 1:
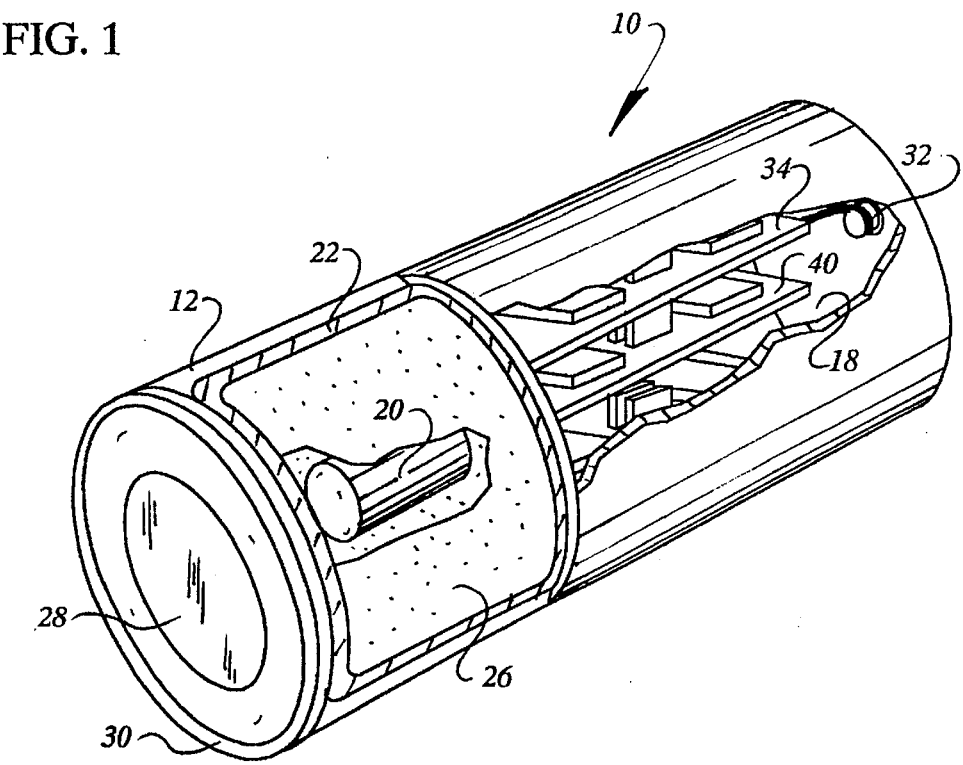
FIG. 1 is a cut-a-way view of the apparatus of the present invention showing the relative positioning of the various components.
Figure 2:
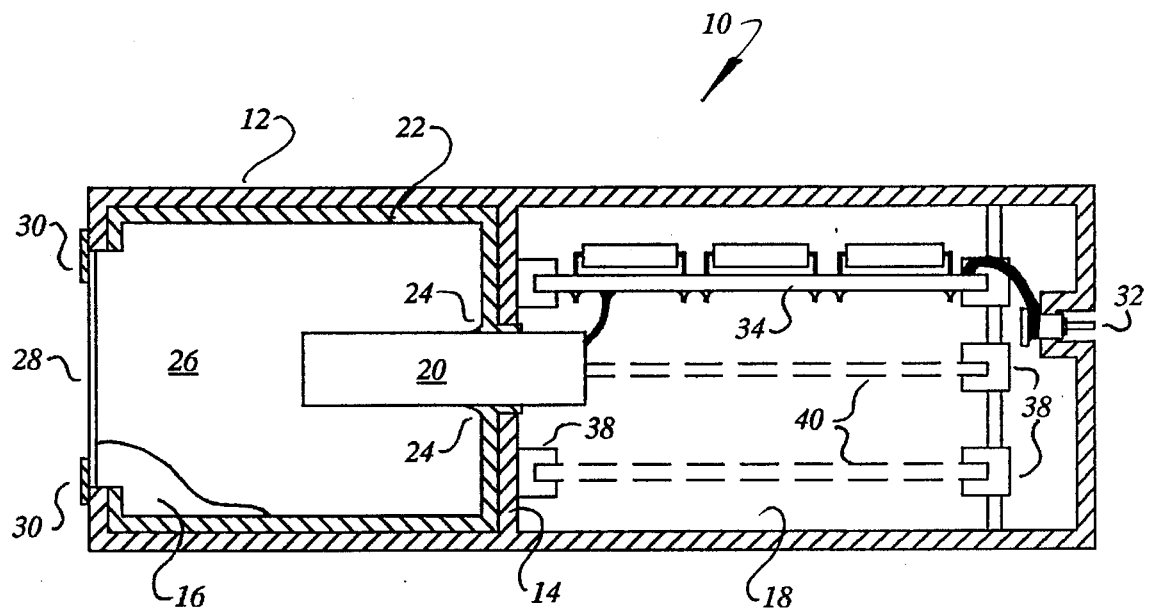
FIG. 2 is a cross sectional view of the apparatus of FIG. 1.

Referring to FIGS. 1 and 2 it will be seen that the apparatus of the present invention, generally designated as 10 in the drawings, is comprised of an elongate zinc tube 12 having a central bore therethrough, closed at one end and incorporating an integral and internal dividing wall 14, the wall separating the tube 12 into a first chamber 16, the first chamber 16 defined by the inner surface walls of the zinc tube 12 and one surface of the separating wall 14, and a second chamber 18, the second chamber 18 defined by the inner surface wall of the zinc tube 12, the inner surface of the closed end of the zinc tube 12 and the opposite surface of the separating wall 14.

An elongate, solid and generally cylindrical carbon rod 20 is positioned within the first chamber 16 and extends co-axially through a central bore in the internal separating wall 14 and into the second chamber 18.

An insulating coating 22 of any conventional and appropriate material such as plastic is applied to the internal surfaces of the first chamber 16 as defined by the inner wall surfaces of the zinc tube 12 and the separating wall 14 and forms a seal and insulating ring 24 between the carbon rod 20 and the central bore in the separating wall 14.

A compaction of powdered Manganese Dioxide 26 is inserted into the first chamber 16, fills the first chamber 16, completely encases the carbon rod 20 and is in intimate contact with the carbon rod 20.

A porous membrane 28 of any conventional material appropriate to permit the passage of digestive fluids through the membrane 28 and into the first chamber 16 covers the opening to the first chamber 16 and is secured in place on the opening to the first chamber 16 by conventional snap ring means 30.

An electrical terminal 32 of conventional design is inserted through the zinc tube 12 end wall and into the interior of the second chamber 18.

A conventional printed circuit board 34 containing the electrical components comprising the power management circuitry, generally designated as 36 in the drawings is inserted into the second chamber 18 and secured therein by any conventional and appropriate means such as circuit board mounting snaps 38 and electrically connected to the carbon rod 20, the casing of the zinc tube 12 and the second chamber 18 end closure terminal 32..

Additional printed circuit boards 40 may be installed within the second chamber 18, such circuit boards 40 containing a variety of electrical components comprising body measurement functions, the data from which measurements is transmitted to an external receiving station (not shown).

It will be understood from the foregoing that the apparatus of the present invention is essentially a single electrochemical cell utilizing two dissimilar materials—the zinc tube 12 and the Manganese Dioxide—as the battery "plates" and the naturally occurring digestive fluids found within the animal's rumen as the electrolyte.

Experimentation with the apparatus under simulation has shown that the apparatus of the present invention has the following electrical properties:

a) Open circuit voltage of approximately 900 mV; and
b) an internal series resistance of approximately 200 Ohms.

The various circuitry contained within the cell 10 requires a nominal voltage supply of 5 volts. Estimates indicate that, while operating the circuitry will approximately 30 mA or an operating power requirement of 150 mW. By activating the circuitry a maximum of 200 mS a minimum of every 2000 seconds—duty cycle of 1000—the power consumption of the circuitry is reduced to approximately 150 Micro Watts. Varying the duty cycle to between 5000 to 10000 will, of course further reduce the power requirements.

A step up switching regulator is required to convert the low voltage input from the cell 10 to a usable output sufficient to power the various electronic circuitry. Since such regulators require approximately 900 mV to operate and the cell 10 loaded voltage typically does not exceed 600 mV the need to "bootstrap" the regulator exists. (Bootstrapping is essentially a method used to operate the regulator on the voltage it generates, rather than the voltage available at its input). Since, however the cell 10 cannot produce sufficient voltage to initiate the "bootstrapping" process it is first necessary to "kick start" the cell 10 by applying a relatively large voltage (approximately 5000 mV) across the cell terminals—terminal 32 and the zinc casing 12.

Figure 3:
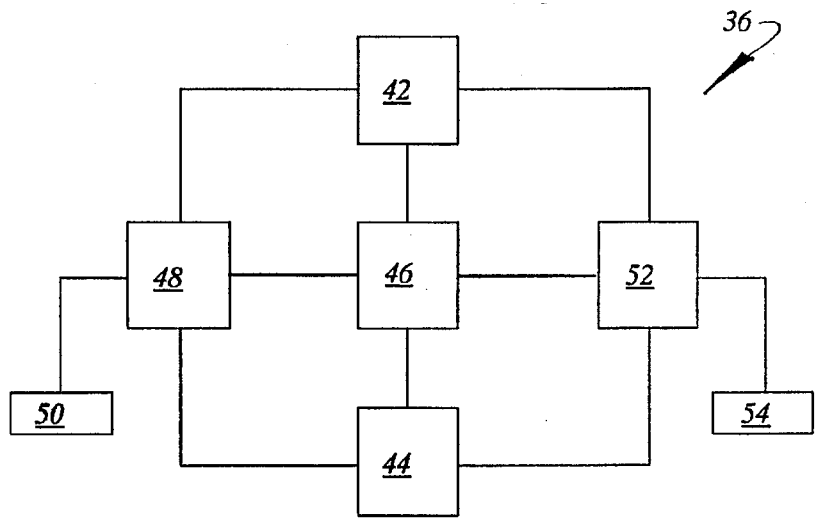
FIG. 3 is a block diagram of the power management electrical circuitry.

Referring to FIG. 3 it will be seen that the power management circuitry 36 of the present invention is comprised of a boot strap power source (BSPS) 42, a power control system 44, a high power source (HPS) 46 in electrical communication with the BSPS 42 and the power control system 44, a primary convertor 48 electrically connected to the cell 10 output 50 and in electrical communication with the HPS 46 and a secondary convertor 52 in electrical communication with the HPS 46 and, in turn, electrically connected to the input 54 of the downstream electrical circuitry.

Figure 4:
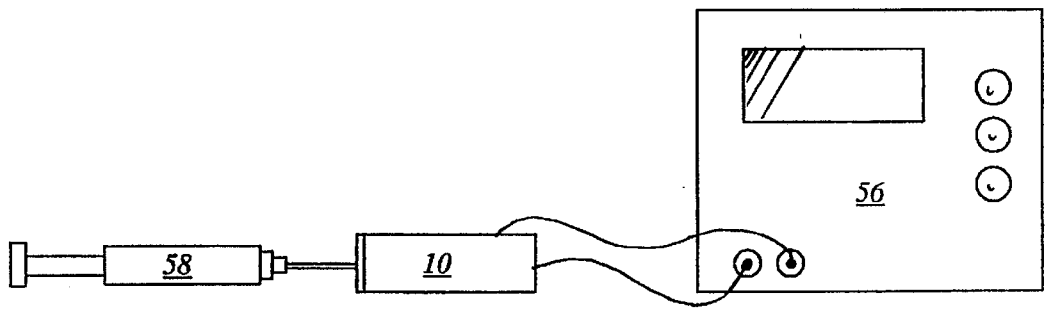
FIG. 4 illustrates a suggested charging procedure to ready the apparatus for insertion into the ruminant.
Figure 5:
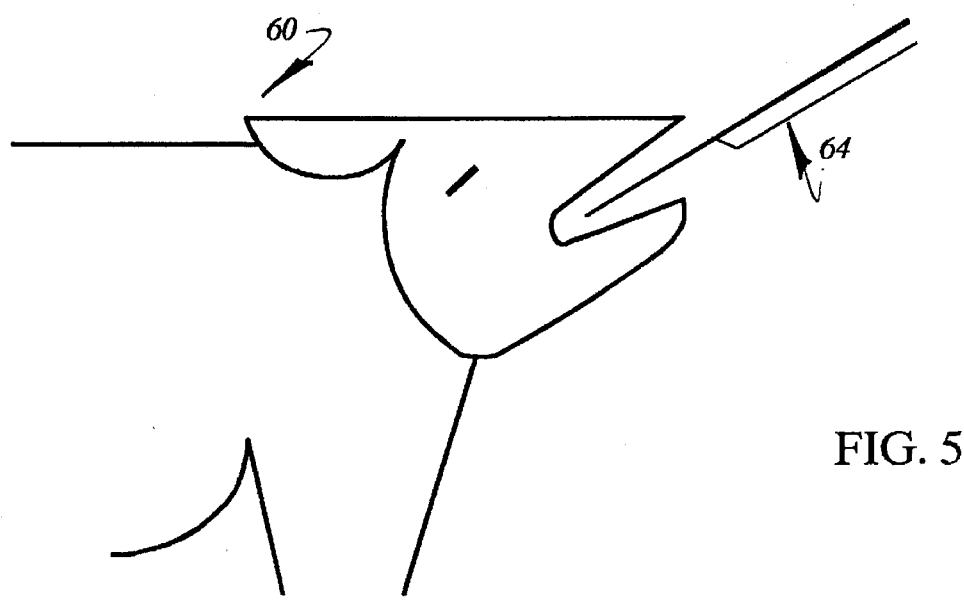
FIGS. 5 and 5A are somewhat schematic representation of an animal, the means of inserting the apparatus of the present invention and the placement of the apparatus within the body of the animal.
Figure 5A:
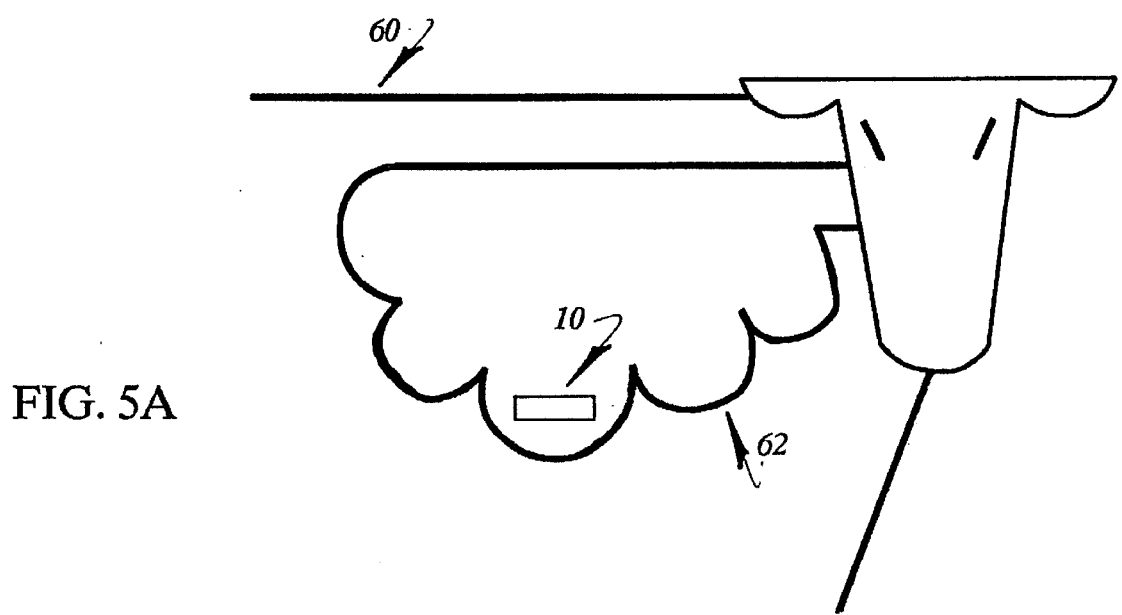

As discussed above, the voltage output from the cell 10 is generally insufficient to initiate the bootstrapping procedure necessary to the normal functioning of the power supply circuitry. Referring then to FIG. 4 it will be seen that prior to insertion in the rumen the apparatus of the present invention is "kick started" by applying a charge from a conventional charger generally designated as 56 across the cell's 10 terminals. In addition, electrolyte in the form of a weak acidic solution is introduced into the cell's 10 first chamber 16 by any conventional and appropriate means such as a syringe 58. Once functioning normally, the cell 10 containing the appropriate circuitry is inserted into the animal's 60 rumen 62 by means of a standard applicator 64.

SUMMARY AND SCOPE OF THE INVENTION

The above description should not be construed as limiting the scope of the present invention but rather as an illustration of a presently preferred embodiment. It is clear that the invention permits of a number of variations and modifications without departure from the spirit of the invention. For example, it is entirely conceivable that a simple dry cell, modified or otherwise may replace the power generation components of the present invention. Thus the scope of the invention should be determined by the appended claims and their legal equivalents.

We claim:

1. An apparatus for producing electrical energy within the body of a ruminant comprising:

elongate tubular casing means having a first internal chamber means and a second internal chamber means, the casing means forming a first electrical cell electrode;

a second electrical cell electrode contained within the casing means first internal chamber and electrically insulated from the first electrical cell electrode;

electron collection means co-axial with the casing means, the collection means extending through the first internal chamber means and into the second internal chamber means;

means for introducing digestive fluids to the first chamber means;

electrical circuit means for converting the electrical energy produced by the combination of the first electrical cell electrode, the second electrical cell electrode and the digestive fluids to a magnitude sufficient to power additional circuitry contained within the second internal chamber means; and means for charging the electrical circuit means prior to normal operation of the electrical circuit means.

2. The apparatus of claim 1 wherein the second electrical cell electrode comprises powdered and compacted manganese dioxide.

3. The apparatus of claim 1 wherein the electron collection means comprises an elongate, solid and generally cylindrical carbon rod.

4. The apparatus of claim 1 wherein the means for introducing digestive fluids to the first internal chamber means comprises a porous membrane, the membrane covering an opening to the interior of the first internal chamber means.

* * * * *